United States Patent [19]

Hamana et al.

[11] 4,001,479

[45] Jan. 4, 1977

[54] NOVEL NAPHTHALATE POLYESTER FIBERS, AND THEIR END USES

[75] Inventors: Isao Hamana; Yoshio Fujiwara; Shiro Kumakawa, all of Iwakuni, Japan

[73] Assignee: Teijin Limited, Osaka, Japan

[22] Filed: Sept. 18, 1975

[21] Appl. No.: 614,639

Related U.S. Application Data

[60] Division of Ser. No. 400,905, Sept. 26, 1973, abandoned, which is a continuation of Ser. No. 242,636, April 10, 1972, abandoned.

[30] Foreign Application Priority Data

| | | |
|---|---|---|
| Aug. 2, 1971 | Japan | 46-58124 |
| Apr. 14, 1971 | Japan | 46-23677 |

[52] U.S. Cl. ............................. 428/272; 260/75 R; 264/290 T; 428/266; 428/290; 428/391; 428/396; 428/447

[51] Int. Cl.[2] ............................. B32B 27/04

[58] Field of Search .......... 428/245, 266, 272, 290, 428/391, 396, 447; 260/75 R, 75 T; 264/210 F, 290 T

[56] References Cited

UNITED STATES PATENTS

| | | | |
|---|---|---|---|
| 3,123,587 | 3/1964 | Hogsed | 260/75 |
| 3,452,132 | 6/1969 | Pitzl | 264/210 F |
| 3,616,832 | 11/1971 | Shima et al. | 264/210 F |
| 3,637,910 | 1/1972 | Shima et al. | 260/75 T |

*Primary Examiner*—James J. Bell

*Attorney, Agent, or Firm*—Sherman & Shalloway

[57] ABSTRACT

A filament, fiber and yarn consisting of a naphthalate polyester containing at least 85 mol % of ethylene-2,6-naphthalate units and having an intrinsic viscosity of 0.3 to 1.0, said filament, fiber and yarn having a diffraction intensity ratio (R) between a Bragg reflection angle 2Θ = 18.7° and 2Θ = 15.6°, as determined by the X-ray diffraction method, being in the range of 0.15 to 1.73.

Electrically insulating material can be produced by heat-treating a fabric consisting mainly of the above naphthalate polyester fibers.

6 Claims, 2 Drawing Figures

NOVEL NAPHTHALATE POLYESTER FIBERS, AND THEIR END USES

Figure 1:
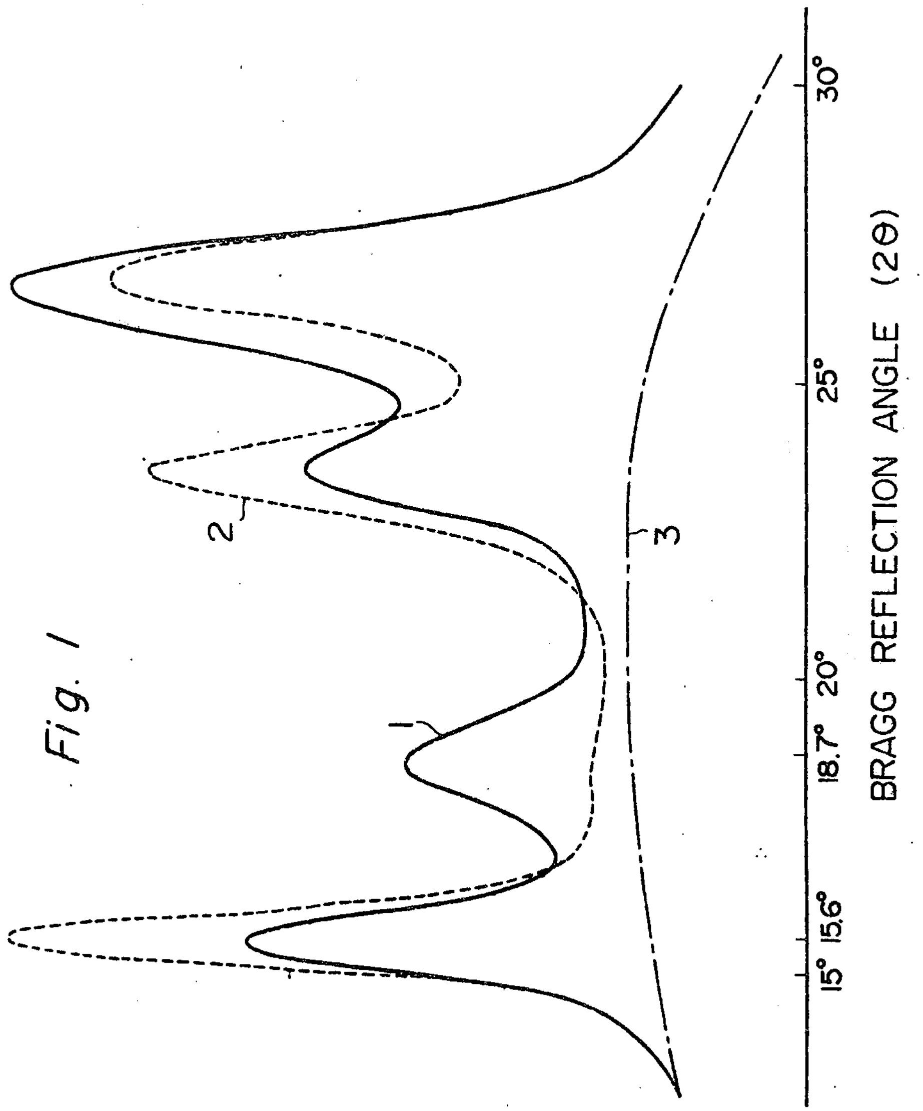

This is a division of application Ser. No. 400,905, filed Sept. 26, 1973, now abandoned which in turn is a continuation of Ser. No. 242,636 filed Apr. 10, 1972, now abandoned.

This invention relates to novel naphthalate polyester fibers, a process for the preparation thereof, and their end uses. More specifically, the invention relates to naphthalate polyester fibers having a novel crystalline structure and being especially suited for electrical insulating materials, a process for producing said fibers on an industrial scale, and their end uses.

Fibers made from the naphthalate polyesters obtained by the reaction of naphthalene-2,6-dicarboxylic acid with ethylene glycol have recently been noted as industrial materials such as rubber-reinforcing materials because of their superiority in mechanical and thermal properties to fibers of polyethylene terephthalate which have been widely used previously.

It has however been thought that the conventional naphthalate polyester fibers are unsuitable for use in the field where knitted, woven or non-woven fabrics made from these fibers are used at high temperatures, especially in the field of electric insulating materials. This is mainly because these naphthalate polyesters have low elongation and suffer a reduction in tenacity at high temperatures.

We made extensive research and development work relating to naphthalate polyester fibers having larger elongation and toughness and less reduction in tenacity at high temperatures than the conventional naphthalate polyester fibers and having suitable properties as electric insulating materials which on the other hand retain excellent properties of the conventional naphthalate polyester fibers, such as high tenacity, high Young's modulus, and good dimensional stability against heat. As a result, it was found that by imparting a special crystalline structure different from those of the conventional naphthalate polyester fibers, the elongation and tenacity at high temperatures of the naphthalate polyester fibers can be improved.

One object of this invention is to provide novel naphthalate polyester fibers having a new crystalline structure, which possess larger elongation and toughness and less reduction in tenacity at high temperatures than the conventional naphthalate polyester fibers.

Another object of this invention is to provide a process for producing the novel naphthalate polyester fibers advantageously.

Still another object of this invention is to provide a fabric suitable for electric insulating materials by heat-treating a fabric consisting mainly of the novel naphthalate polyester fibers.

Other objects will become apparent from the following description of this invention.

According to the present invention, there is provided novel naphthalate polyester fibers, said fibers consisting of a naphthalate polyester containing at least 85 mol % of ethylene-2,6-naphthalate units and having an intrinsic viscosity of from 0.3 to 1.0, said fibers having a diffraction intensity ratio (R) between a Bragg reflection angle $2\Theta = 18.7°$ and $2\Theta = 15.6°$ as determind by the X-ray diffraction method, in the range of 0.15 to 1.73.

The polymer from which the fibers of this invention are formed is polyethylene-2,6-naphthalate or a copolymerized polyethylene-2,6-naphthalate containing not more than 15 mol %, preferably not more than 5 mol %, of a third component.

Generally, polyethylene-2,6-naphthalate is prepared by reacting naphthalene-2,6-dicarboxylic acid or its functional derivative with ethylene glycol or its functional derivative in the presence of a catalyst under proper reaction conditions. When at least one third component is added before the completion of the polymerization, a copolymerized or blended polyester results. Suitable third components are (a) compounds having two ester-forming functional groups, for example, aliphatic dicarboxylic acids such as oxalic acid, succinic acid, adipic acid, sebacic acid or dimeric acid; alicyclic dicarboxylic acids such as cyclopropanedicarboxylic acid, cyclobutanedicarboxylic acid, or hexahydroterephthalic acid; aromatic dicarboxyli acids such as phthalic acid, isophthalic acid, naphthalene-2,7-dicarboxylic acid or diphenyldicarboxylic acid; carboxylic acids such as diphenyl ether dicarboxylic acid, diphenyl sulfone dicarboxylic acid, diphenoxydiethane dicarboxylic acid or sodium 3,5-dicarboxybenzenesulfonicate; hydroxycarboxylic acids such as glycolic acid, p-hydroxybenzoic acid or p-hydroxyethoxybenzoic acid; hydroxy compounds such as propyl glycol, trimethylene glycol, diethylene glycol, tetramethylene glycol, hexamethylene glycol, neopentylene glycol, p-xylene glycol, 1,4-cyclohexanedimethanol, bisphenol A, p,p-diphenoxysulfone, 1,4-bis ($\beta$-hydroxyethoxy) benzene, 2,2-bis(p-$\beta$-hydroxydiethoxyphenyl) propane, polyalkylene glycol, or p-phenylene bis(dimethylsiloxane) or functional derivatives thereof; or high-molecular-weight compounds derived from said carboxylic acids, hydroxycarboxylic acids, hydroxy compounds or functional derivatives thereof, (b) compounds having one ester-forming functional group, such as benzoic acid, benzoylbenzoic acid, benzyloxybenzoic acid, or methoxypolyalkylene glycol, and (c) compounds having three or more ester-forming functional groups, such as glycerol, pentaerythritol or trimethylol propane. Needless to say, the polyester may contain a delusterant such as titanium dioxide or a stabilizer such as phosphoric acid, phosphorous acid, and esters thereof. The amount of the third component must not be more than 15 mol %, preferably not more than 5 mol %. If the amount is in excess of 15 mol %, it frequently results in a considerable reduction in the thermal stability, tenacity, elongation and elastic recovery of the fibers obtained, and therefore such excessive amounts should be avoided.

The naphthalate polyester used in this invention has an intrinsic viscosity ($\eta$) of from 0.3 to 1.0. The intrinsic viscosity as used in the present specification is a value obtained from the viscosity of the polymer which is measured with respect to a solution of the polymer in a 1:4 mixture of phenol and o-dichlorobenzene at 35° C. When the intrinsic viscosity of the naphthalate polyester exceeds 1.0, its melt viscosity becomes exceedingly high, making the melt-spinning difficult. If the intrinsic viscosity is less than 0.3, the resulting fibers do not possess the good properties intended.

The greatest feature of the fibers of the present invention resides in their novel crystalline structure. This crystalline structure is characterized by a diffraction intensity ratio (R) between a Bragg reflection angle $2\Theta = 18.7°$ and $2\Theta = 15.6°$ in the diffraction intensity distribution curve in the equatorial direction as determined by the X-ray diffraction method, being within the range of 0.15 to 1.73.

Figure 2:
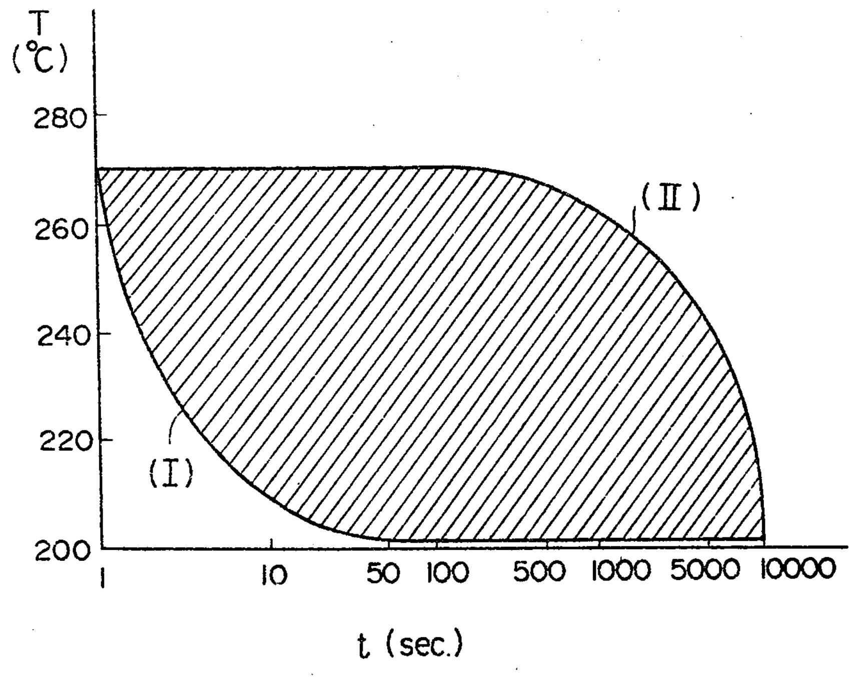

In the accompanying drawings,

FIG. 1 is a graphic representation illustrating the diffraction intensity distribution curve in the equatorial direction of the naphthalate polyester fibers of this invention and conventional naphthalate polyester fibers obtained by the X-ray diffraction method, and FIG. 2 is a graphic representation showing the relation between the heat-treating temperature and heat-treating time at the time of scouring a woven fabric made from the fibers of this invention.

The conditions of the measurement of the diffraction intensity curve as shown in FIG. 1 were as follows:

Device: Model D-9C (product of Rigaku Denki Kabushiki Kaisha) Nickel filter, 35 KV, 20 mA Divergence slit: 0.15 mm Scattering slit: 1°

Receiving slit: 0.4 mm $\lambda = 1.542$A

Referring to FIG. 1, curve 1 illustrates the diffraction intensity distribution curve of the fibers of this invention, and curve 2 illustrates the diffraction intensity distribution curve of the conventional naphthalate polyester fibers. Curve 3 shows the diffraction intensity distribution curve of amorphous naphthalate polyester fibers.

The diffraction intensity ratio (R) between a Bragg reflection angle $2\Theta = 18.7°$ and $2\Theta = 15.6°$, as used in the present specification and claims, is calculated in accordance with the following equation.

$$R = (Ic18.7° - Ia18.7°)/(Ic15.6° - Ia15.6°)$$

wherein Ic18.7° and Ic15.6° are the diffraction intensities (height of peak in the curve) at a Bragg reflection angle $2\Theta = 18.7°$ and $2\Theta = 15.6°$ respectively in the X-ray diffraction intensity distribution curve of the fibers, and Ia18.7° and Ia15.6° are the diffraction intensities of the amophous fibers at a Bragg reflection angle of $2\Theta = 18.7°$ and $2\Theta = 15.6°$ in the diffraction intensity distribution curve.

As is clear from FIG. 1, the conventional naphthalate polyester fiber (curve 2) has a high peak at a Bragg reflection curve $2\Theta = 15.6°$, but is substantially devoid of a peak at $2\Theta = 18.7°$. Therefore, these polyester fibers have a diffraction intensity ratio (R) of as small as about 0.07. In contrast, the naphthalate polyester fiber of this invention (curve 1) has a unique peak at $2\Theta = 18.7°$, and a diffraction intensity ratio (R) of about 0.55, which is considerably higher than that of the conventional naphthalate polyester fibers.

The fibers of this invention, owing to their novel crystalline structure described above, retain sufficient tenacity, and have a higher elongation than the conventional fibers. If the tenacity of the fibers is expressed as T(*g/d*) and their elongation, as E(%), the fibers have a toughness, as expressed by $T \times \sqrt{E}$, of at least 21.5, and the value E becomes 13 – 40 %. Conventional naphthalate polyester fibers having an R value of less than 0.15 have a tenacity of about 5.5 *g/d*, and their elongation is as low as or less than 15 %, and their toughness is insufficient. On the other hand, if R becomes larger than 1.73, the elongation increases but the tenacity decreases. Therefore, naphthalate polyester fibers having an R value of larger than 1.73 are not feasible.

Furthermore, the fibers of this invention have the advantage that they suffer little from a reduction in tenacity at high temperatures. For example, when the conventional naphthalate polyester fibers are treated for 6 hours in wet heat at 150° C., the tenacity retention is less than 50 %. But when the fibers of the present invention are treated in the same way, the tenacity retention is increased to about 55 % or more. The fibers of this invention also have superior resistance to light.

Since the fibers of this invention have a greatly improved elongation and superior thermal stability, resistances to wet heat and light, various troubles (such as the occurrence of fuzzes, or the reduction of tenacity) in the processing of the fibers, such as in weaving or knitting operation, can be avoided. Thus, these fibers give textile articles which are useful for apparel and industrial applications which require thermal stability or resistance to heat. Examples of the applications of the fibers of this invention based on their good resistance to heat are working wear and carpets for high temperatures, and high temperature gas filters, and they are especially useful as electric insulating materials. Furthermore, these fibers are useful for paper-making canvess or filters for hot water, because of their good resistance to wet heat.

The fibers of this invention can be in the form of continuous filaments, staple fibers, tows, yarns and bristles.

The fibers of this invention are obtained by heating undrawn yarns consisting of a naphthalene polyester containing at least 85 mol % of ethylene-2,6-naphthalate units and having an intrinsic viscosity of 0.3 to 1.0 and a birefringence ($\Delta n$) of 0.0275 or less, at a temperature of 112° to 170° C. for at least 0.43 second, and subsequently, drawing the yarns at a draw ratio (DR) defined by the following equation.

$$-1.05 \times 10^2 \cdot \Delta n + 4.41 \leqq DR \leqq -0.95 \times 10^2 \cdot \Delta n + 5.99.$$

They can be obtained, for example, by spinning the polymer described above at a spinning speed of not more than 1500 meters/min. at a spinning temperature of 300° to 330° C. to form undrawn yarns having a birefringence of not more than 0.0275, wrapping these yarns around a heated feed roller heated at 112° C. to 170° C., heating the yarns on said roller for at least 0.43 second, subsequently drawing the yarns at a draw ratio as defined by the following equation $$-1.05 \times 10^2 \cdot \Delta n + 4.41 \leqq DR \leqq -0.95 \times 10^2 \cdot \Delta n + 5.99$$

and then heat-treating the drawn yarns at a temperature not lower than 140° C. but below the melting point of the yarns for 0.01 to 10 seconds. When the spinning speed is relatively high, a heated spinning cell is provided below the spinneret, and the temperature of the atmosphere below the spinneret is maintained at 250° to 400° C. to adjust the birefringence of the yarns to 0.0275 or less. Of the above-mentiond drawing and heat-treating conditions, the heating temperature and time before drawing most affect the crystalline structure of the yarns. In an ordinary drawing using a hot pin, the R of the yarns is far smaller than 0.15 because of insufficient heating prior to drawing.

If the birefringence ($\Delta n$) of the undrawn yarns is larger than 0.0275, troubles will occur even if the undrawn yarns are drawn at a draw ratio specified above. If the drawing is carried out at a relatively small ratio in the above mentioned range, the yarns remain partly undrawn, and when the drawing is carried out at a relatively large draw ratio, fuzzes or filament breakage occurs. Accordingly, not only is it impossible to obtain a stable drawing operation, but also the resulting yarns have an R value less than 0.15.

When the heating temperature before drawing is lower than 112° C., the drawing tension becomes excessively high to cause an excessive molecular orientation, which in turn reduces the R value below 0.15 and cannot lead to the achievement of the objects of this invention. If, on the other hand, the heating temperature before drawing exceeds 170° C., the melt-adhesion of the individual filaments occurs, and stable drawing cannot be performed.

If the heating time before drawing is shorter than 0.43 second, the result is the same as when the heating temperature is lower than 112° C.

When the draw ratio (DR) is smaller than $-1.05 \times 10^2 \cdot \Delta n + 4.41$, the R value exceeds 1.73, and the tenacity becomes less than 4.4 *g/de*. Hence, the yarns obtained become less feasible. And because of the undrawn portion, it is impossible to obtain yarns of stable quality. When the draw ratio exceeds $-0.95 \times 10^2 \cdot \Delta n + 5.99$, the R value becomes smaller than 0.15, and the elongation becomes lower than 13 %.

The novel naphthalate polyester fibers thus obtained are made into a fibrous cloth in order to use them for the various applications mentioned above. The fibrous cloth can be easily produced by a weaving, knitting or felting process employed for processing other synthetic fibers.

The operability at the time of weaving, knitting or felting is the same as, or better than, that at the time of processing polyethylene terephthalate fibers. The appearance and handling properties of the resulting fibrous clothes also prove comparable to other synthetic fibers.

These good results are ascribable to the novel crystalline structure of the fibers of this invention which leads to the retention of sufficient tenacity and the possession of larger elongations than the conventional naphthalate polyesters. The tenacity of the fibers that constitutes the fibrous cloth, when measured after disentangling the fibers, showed a decrease of only about 10%. Furthermore, the R value which represents the properties of the crystalline structure decreases only several percent. When fibers having an R value of 0.65 are used, the disentangled fibers of the resulting fibrous cloth have an R value of about 0.61. This decrease is considered to be due to a tension exerted at the time of weaving, knitting or felting.

The fibers of this invention can be made, as mentioned above, into woven fabrics of optional textures such as plain weave, twill weave or satin weave, knitted fabrics such as circular knitted goods, or non-woven fabrics such as needle-punched non-woven fabrics, bonded non-woven fabrics or spun-bonded non-woven fabrics. These fibrous cloths may be of the interwoven, inter-knitted, mix-woven, or mix-spun type. Or they may be laminated to films or paper.

The fibrous cloth is then subjected to such a step as boiling in loop, roller drying, or heat-treatment. Of these, the heat-treatment especially exerts a great influence on the properties of the fibrous cloth obtained, and the properties of it in subsequent processing steps, that is, shrinkage, flatness, and dimensional stability against heat.

Needless to say, the heat-treatment conditions are defined by the heat-treatment temperature (T° C) and the heat-treating time (*t* in seconds), and it has been found that the effective heat-treatment temperature in the present invention is not lower than 210° C. but below the melting point of the fibers. Extensive experiments were conducted as to the heat-treatment time at various temperature levels. As a result, it was found that by heat-treating the fibrous cloth under conditions which meet the following two equations, there can be obtained a cloth of naphthalate polyester fibers which have superior heat resistance and mechanical strength, and also flatness, dimensional stability against heat and low shrinkage, and which have uniform texture and especially suitable as electric insulating materials.

$$T-200 \geqq 70 \cdot e^{-2 \log_{10} t} \quad (1)$$
$$T-200 \leqq 70[1-e^{-2(4-\log_{10} t)}] \quad (2)$$

wherein *e* is the base of a natural logarithm.

Referring to FIG. 2 which shows the relation between the heat-treating temperature and the heat-treating time, the hatched portion surrounded by curves (I) and (II) corresponding to the equations (1) and (2) above shows a combination of the heat-treating temperature and the heat-treating time, which is closely related to the properties of the heat-treated cloth, that is, dimensional stability against heat, stability, shrinkage and flatness.

When this relation between the heat-treating temperature and the heat-treating time is not satisfied, that is, when the relation is shown by portions outside the hatched one, the properties of the heat-treated cloth are not satisfactory for practical purposes.

The disentangled fibers which constitute the heat-treated fibrous cloth subjected to the heat-treatment meeting the above-mentioned temperature and time requirements have a novel crystalline structure quite different from that of the conventional naphthalate polyester fibers. Unless the R value as a measure of the novel crystalline structure is within the range of 0.05 to 1.5, improved heat dimensional stability, shrinkage and flatness of the fibrous cloth cannot be expected. If this R value is less than 0.05, the fibrous cloth has poor dimensional stability against heat and poor shrinkage, and when it exceeds 1.5, a fibrous cloth of good flatness cannot be obtained. Thus, varnishes cannot be uniformly impregnated in the resulting cloth. When the cloths are cut into the form of tapes, it is difficult to cut them to have a straight edge. In addition, the tenacity of the fabric is reduced in the subsequent processing step.

The heat-treatment under conditions defined by the equations (1) and (2) above can be performed by using a known apparatus such as a tenter (blast furnace type heat-treating device or a roll-type heat-treating device). The heat-treatment can be performed either under tension or while allowing a restricted shrinkage. Since the naphthalate polyester cloth, when heat-treated while allowing a restricted shrinkage, tends to have a reduced tenacity, the shrinkage should preferably be limited to not more than 15 % of the original length. If it exceeds 15 %, the above-mentioned advantages cannot be obtained. The above-mentioned heat-treatment may be performed continuously during the course of processing the fibers, such as weaving or scouring, or before or after converting the fibers into a final product such as electric insulating materials.

Previously, natural fibers, semi-synthetic fibers and synthetic fibers have been mainly used as an electric insulating material in the form of fibers and fabrics, and supported the technical progress of machinery and appliances in the electrical, communication, and electronic fields because of their stable quality and abundance of supply. However, these materials can be continuously used at a temperature not more than 120° C. (heat resistance, grade E), and as materials that can be used continuously at 130° C. (grade B) and 155° C. (grade F), inorganic fibers such as glass fibers or asbestos fibers, which are inferior in processability, pliability, toughness and handling should be used. Therefore, it has been difficult to use electric and electronic machinery and appliances of grades B and F and to make them small-sized.

For example, polyethylene terephthalate is a typical fibrous electric insulating material of grade E now in use, but does not possess heat resistance ranked in grade E in spite of its superior processability and mechanical properties. Recently, fibrous cloths of aromatic polyamides (NOMEX, tradename of Du Pont) were developed, and used as an organic fibrous cloth having sufficient heat resistance as impregnating insulating materials (at temperatures higher than grades B and F). This cloth is used after impregnating a heat-resistant resin varnish of the same or different heterocyclic type. Such varnish-impregnated polyamide cloths can withstand temperatures higher than grade F (180° C., grade H) and have superior resistance to chemicals. On the other hand they have hygroscopicity and insufficient electrical and mechanical properties during or after impregnation of the varnish. Moreover, because of large space occupying ratio, these polyamide cloths lend themselves to difficult handling when used for wrapping compact portions.

The naphthalate polyester fabrics of this invention have sufficient heat resistance as compared with the conventional fibrous electric insulating materials of grade B or F, and possess far superior mechanical properties and processability. Thus, they can contribute to the small size and light weight of the machinery and can be used in the machinery of grade F.

Attempts have been made to provide naphthalate polyester cloths impregnated with a varnish, which have pliability, flexibility, and heat resistance of grade B or F, and which sufficiently retain their properties even under wet conditions. As a result, we have found that such naphthalate polyester cloths can be obtained by impregnating the naphthalate polyester cloths with a varnish of the alkyl, polyurethane, epoxy, acrylonitrile, and silicone type and also a heat-resistant varnish of the heterocyclic type either alone or in combination.

Examples of the varnish that can be used in the present invention include alkyd type varnishes,, alkyd-modified polyurethane varnishes, acrylic varnishes, alkyd-modified silicone varnishes, alkyd-modified epoxy varnishes, and other varnishes having high heat resistance corresponding to said substrate. But because the above-mentioned substrate has good heat resistance, alkyd-modified silicone varnishes, alkyd-modified epoxy varnishes, varnishes from polyamide imides, polyimides or vinyl fluoride polymers give better results.

One of the great features of this invention is that the naphthalate polyester cloth of this invention can be impregnated especially with the polyamide imide, polyimide, and vinyl fluoride polymer as mentioned above. The conventional substrate composed mainly of an organic fiber is attacked by a high-boiling polar solvent such as N,N'-dimethyl formamide, N-methyl-2-pyrrolidone or N,N'-dimethyl acetamide especially when evaporating it, or cannot be a varnish-impregnated cloth of uniform quality because of heat shrinkage. However, the naphthalate polyester cloth fully withstands drying temperatures at above 200° C., and has sufficient shrinkage and superior dimensional stability and flatness. Hence, using the varnish described above, a varnish-impregnated cloth of excellent quality can be produced. Of course, the above varnish can be applied to glass fiber cloth or asbestos fiber cloth, but the resulting impregnated cloth lacks pliability and is very weak against bending.

The naphthalate polyester cloth impregnated with the varnish has superior mechanical properties, i.e., large tensile strength, Young's modulus, rupture strength, tear strength and bending strength, and also good thermal properties and dimensional stability, and exhibits stable electrical properties over a wide range of temperatures. Furthermore, the naphthalate polyester substrate cloth has sufficient resistance to various varnishes, insulated oil, freon, refregerator oils, various organic solvents and plasticizers. Thus, by a proper choice of varnish according to the purpose of application, there can be obtained a fibrous insulating material which is far more functional than the conventional varnish-impregnated cloth. Furthermore, this fibrous insulating material has handling and processing properties equal to, or even better than, those of the conventional materials which have found wide applications. The varnish-impregnated fibrous cloth obtained by this invention is also comparable to the conventional varnish-impregnated cloths having heat resistance ranked in grade B or F, and can be used as an electrical insulating material having far better functions in mechanical properties, processability, quality, and the quantity that can be supplied.

The electrical insulating material of this invention can be used as cloth, cloth tape, cloth tube, or sleeve in the form of a naphthalate polyester fibrous cloth alone, or as varnish cloth, varnish cloth tape, varnish cloth tube, or laminating pre-preg in the form impregnated with a varnish. The electric insulating material of this invention can also be used as laminates or other processed articles obtained by bonding or melt-bonding, using an organic material such as films or an inorganic insulating material such as glass, asbestos, mica. Also, it will be used in other specific fields by incorporation of various anti-oxidants or fire-retarding agents.

The invention will now be described specifically by the following Examples, which will further demonstrate the above-mentioned advantages of this invention. The diffraction intensity distribution curve in the equatorial direction according to the X-ray diffraction method, the load-elongation curve and resistance to wet heat were determined by the following methods.

X-ray Diffraction Pattern

Device: D-9C (device produced by Rigaku Denki Kabushiki Kaisha)
35 KV × 20 mA, nickel filter used
Divergence slit: 0.15 mm Scattering slit: 1°
Receiving slit: 0.4 mm
$\lambda = 1.542$ A Load-Elongation Curve Length of the sample: 20 cm
%/min. at 25° C. and
Relative Humidity (RH) 65 %

The break strength obtained from the load-elongation curve, and a reduction in denier incident to the rising of the elongation were not corrected.

Resistance to wet heat

The specimen is put into water, and treated at 150° C. for 6 hours in a closed vessel (autoclave), and the tenacity retention of the specimen is measured.

Electrical and Mechanical Properties of Varnish-Impregnated Cloth

1. Tensile strength and elongation

A tensile test is performed in a room at 23° C. and a RH of 50 % at a pulling speed of 200 mm/min. with the width of the sample and the holding span being adjusted to 15 mm and 150 mm respectively. The strength and elongation at the time of breakage are measured. (JIS C-2318)

2. Mullen bursting strength

Measured in accordance with JIS T-8112 in a room at 23° C. and an RH of 50 %.

3. Schopper bending strength

Measured in accordance with JIS T-8114 in a room at 23° C. and an RH of 50 %.

Volume Resistivity

A potential of 500 V is applied to the specimen at 20° C., and a leaked current after 1 minute is measured. The volume resistivity is obtained by dividing the voltage by the current. (JIS C-2318)

Dielectric Breakdown Strength

Voltage is raised from zero at a rate of 500 V/sec. to 1000 V/sec. The strength is obtained by dividing the voltage which induces short-circuit by the thickness of the specimen. (JIS C-2318)

EXAMPLE 1

Polyethylene-2,6-naphthalate having an intrinsic viscosity of 0.65 was melt-spun at 320° C. through a spinneret having circular orifices with a diameter of 0.46 mm, and wound up at a rate of 800 m/min. A heating cell 20 cm long was provided immediately beneath the spinneret, and the atmosphere under the spinneret was maintained at 315° C. The resulting 200 denier/24 filaments undrawn yarn having a birefringence of 0.0120 which was thus wound up was wrapped through eight turns around a heated feed roller with a diameter of 90 mm, preheated on the roll, and then drawn to 4.0 times, followed by drawing and heat-treatment by a slit heater heated at 250° C. The resulting yarn was wound up at a rate of 530 m/min. The properties of the yarn obtained are shown in Table 1 below.

Table 1

| Experiment | Temperature of feed roller (° C) | R | Tenacity (g/de) | Elongation (%) | Toughness (g. $\sqrt{\%}$ ) |
|---|---|---|---|---|---|
| 1 | 115 | 0.60 | 5.61 | 22.8 | 26.8 |
| 2 | 130 | 0.63 | 5.68 | 22.9 | 27.8 |
| 3 | 145 | 0.70 | 5.66 | 23.6 | 27.5 |

EXAMPLE 2

Polyethylene-2,6-naphthalate having an intrinsic viscosity of 0.60 was melt-spun at 315° C. using a spinneret having circular orifices with a diameter of 0.4 mm, and then taken up at a rate of 600 m/min. A heating cell 10 cm long was provided immediately beneath the spinneret, and the atmosphere below the spinneret was maintained at 270° C. The resulting 400 denier/48 filaments undrawn yarn having a birefringence of 0.0150 which was thus taken up was heated for various periods of time on a feed roller heated at 145° C., and then drawn with a slit heater heated at 250° C., followed by taking it up at a rate of 600 m/min. The draw ratio was varied at this time, and the properties of the resulting filaments are shown in Table 2 below.

Table 2

| Run Nos. | Draw ratio | Heating time (sec) | R | Tenacity (g/de) | Elongation (%) | Tenacity retention(%) in heat* | Tenacity retention(%) in light** | Toughness (g. $\sqrt{\%}$ ) |
|---|---|---|---|---|---|---|---|---|
| 4 | 3.3 | 1.36 | 1.02 | 5.20 | 30.6 | 73.6 | 80.9 | 28.8 |
| 5 | 3.6 | 1.48 | 0.99 | 5.48 | 29.7 | 71.8 | 79.0 | 29.9 |
| 6 | 3.9 | 1.61 | 0.79 | 5.62 | 24.9 | 69.3 | 75.0 | 28.0 |

*Treated for 6 hours in wet heat at 150° C.
**Irradiated for 50 hours with a Xenon lamp.

COMPARATIVE EXAMPLE 1

The undrawn yarn obtained in Example 2 was drawn at a draw ratio of 3.3, 3.6, 3.9, and 5.0 respectively using a hot pin and plate (preheating time 0.11 second, draw pin temperature 155° C., plate temperature 200° C.). The yarn was then taken up at a rate of 600 meters/min. The results are given in Table 3. The yarns obtained all lacked transparency, and had a tenacity at break of 4.4 *g/de* or above. But these yarns had a toughness of less than 21.5, and an X-ray diffraction intensity ratio (R) of less than 0.15.

Table 3

| Run Nos. | Draw ratio | R | Tenacity (g/de) | Elongation (%) | Toughness (g. $\sqrt{\%}$ ) | Drawability |
|---|---|---|---|---|---|---|
| 7 | 3.3 | 0.13 | 4.72 | 18.1 | 20.1 | containing undrawn portion |
| 8 | 3.6 | 0.10 | 5.24 | 14.2 | 19.7 | Good |
| 9 | 3.9 | 0.08 | 5.73 | 10.1 | 18.2 | Good |
| 10 | 5.0 | 0.05 | 7.11 | 7.0 | 18.7 | Frequent filament breakage |

COMPARATIVE EXAMPLE 2

The procedure of Example 1 was repeated except that a heating cell was not provided under the spinneret, and an undrawn yarn having a birefringence of 0.033 was taken up at a rate of 1100 meters/min. The results are shown in Table 4.

Table 4

| Run No. | Temperature (° C.) of feed roller | Draw ratio | R | Tenacity (g/de) | Elongation % | Toughness T.E. (g.%) | Drawability |
|---|---|---|---|---|---|---|---|
| 11 | 145 | 2.8 | 0.13 | 6.6 | 10.7 | 21.6 | Frequent filament breakage |

EXAMPLE 5

The procedure of Example 1 was repeated except that the temperature of the heating feed roller was changed to 145° C., and the temperature of the slit heater, to 280° C. The preheating temperature was also changed. The results are shown in Table 7.

Table 7

| Run Nos. | Draw ratio | Heating time (sec) | R | Tenacity (g/de) | Elongation (%) | Tenacity % in heat* | retention in light** | Toughness (g. $\sqrt{\%}$ ) |
|---|---|---|---|---|---|---|---|---|
| 20 | 4.0 | 1.36 | 0.42 | 5.70 | 17.6 | 69.6 | 75.9 | 23.9 |
| 21 | 4.0 | 0.40 | 0.11 | 5.50 | 12.5 | 45.7 | 56.9 | 19.4 |

Note: Run No. 21 is a comparison.
*Treated for 6 hours in wet heat at 150° C.
**Irradiated for 50 hours with a Xenon lamp.

EXAMPLE 3

The procedure of Example 1 was repeated except that the roller heating temperature was changed to 145° C., and the draw ratio was changed to 3.0, 3.5, 4.2, and 5.0. The results are given in Table 5 below.

Table 5

| Run Nos. | Draw ratio | R | Tenacity (g/de) | Elongation (%) | Toughness (g. $\sqrt{\%}$ ) | Drawability |
|---|---|---|---|---|---|---|
| 12 | 3.0 | 1.93 | 4.25 | 44.0 | 28.2 | containing undrawn portion |
| 13 | 3.5 | 1.06 | 5.21 | 28.3 | 27.7 | Good |
| 14 | 4.2 | 0.44 | 6.26 | 18.2 | 26.7 | Good |
| 15 | 5.0 | 0.12 | 7.10 | 10.5 | 23.0 | Sometimes filaments broken |

Note: Runs 12 and 15 are comparisons.

EXAMPLE 4

The procedure of Example 1 was repeated except that the draw ratio was changed to 4.8. The results obtained are shown in Table 6.

Table 6

| Run Nos. | Temperature (° C.) of feed roller | R | Tenacity (g/de) | Elongation (%) | Toughness (g. $\sqrt{\%}$ ) |
|---|---|---|---|---|---|
| 16 | 110 | 0.12 | 5.0 | 12.0 | 17.3 |
| 17 | 115 | 0.16 | 5.86 | 14.0 | 21.9 |
| 18 | 130 | 0.28 | 6.49 | 15.0 | 25.1 |
| 19 | 145 | 0.33 | 7.02 | 16.2 | 28.3 |

Note: Run No. 16 is a comparison.

EXAMPLE 6

The procedure of Example 1 was repeated except that the time spent for heating the undrawn yarn with the roller was changed to 1.28, 1.41, 1.54, 1.66, and 1.79 seconds respectively, and the temperature of the roller was changed to 145° C. The draw ratio and the heating time were also changed, and the results obtained are given in Table 8.

Table 8

| Run Nos. | Draw ratio | Heating time (seconds) | R | Tenacity (g/de) | Elongation % |
|---|---|---|---|---|---|
| 22 | 3.0 | 1.28 | 2.52 | 3.08 | 43.9 |
| 23 | 3.3 | 1.41 | 1.02 | 5.20 | 30.6 |
| 24 | 3.6 | 1.54 | 0.79 | 5.62 | 24.9 |
| 25 | 3.9 | 1.66 | 0.42 | 5.70 | 17.6 |
| 26 | 5.2 | 1.79 | 0.091 | 7.49 | 6.2 |

Note: Runs Nos. 22 and 26 are comparisons. The drawn yarns were 47.5 de/25 fils yarns.

Each of these draw yarns was twisted, sized, and drawn in to form a warp, and in a weft step, bobbin delivery, Italian twisting, and pirn winding were performed to form a woven fabric having a width of 101 cm. The warp and weft densities at this time were 72 × 31/inch.

The woven fabric was scoured under the following conditions.

The fabric was boiled in loop in warm water held at 90° to 100° C., and the adhering residual size was reduced to less than 0.2 %. Thereafter, the fabric was roller dried at 120° C. The fabric was passed through a pin tenter 15 m long at a speed of 20 meter/min. at 230° C., and heat-set at a stretch of 1 % to form a naphthalate polyester woven fabric. The warp and weft densities were 74 × 32.5/inch.

The properties of the woven fabric are shown in Table 9.

Table 9

| Drawn yarns Runs Nos. | Run No. 22 27 | 23 28 | 24 29 | 25 30 | 26 31 |
|---|---|---|---|---|---|
| Tensile strength (Kg/cm²) | | | | | |
| Warp | 120 | 750 | 900 | 1100 | 1250 |
| Weft | 110 | 690 | 800 | 1050 | 1240 |
| Tensile elongation (%) | | | | | |
| Warp | 60–80 | 27 | 23 | 18 | 2.0 |
| Weft | 55–75 | 35 | 30 | 19 | 2.0 |
| Tensile elasticity (× 10³ Kg/cm²) | | | | | |
| Warp | 1.2 | 15 | 17 | 18 | 15 |
| Weft | 1.1 | 11 | 12 | 16 | 13 |
| Elemendorf tear strength (Kg) | | | | | |
| Warp | 0.3 | 1.0< | 1.2 < | 0.9< | 0.1 |
| Weft | 0.2 | 1.2< | 1.7< | 1.0< | 0.1 |
| R value of the disentangled filaments | | | | | |
| Warp | 1.92 | 0.95 | 0.65 | 0.30 | 0.025 |
| Weft | 1.81 | 0.86 | 0.70 | 0.25 | 0.022 |

EXAMPLE 7

The procedure of Example 1 was repeated except that the temperature of the feed roller was changed to 130° C. to form pirns with 50 denier.

Thirty-nine pirns were doubled, and subjected to a weaving process. In a warp step, bobbin delivery, twisting, roller sizing, and drawing in were performed, and in a weft step, bobbin delivery, twisting and pirn winding were performed, thereby to form a woven fabric 101 cm wide. The warp and weft densities at this time were 72 × 31/inch. The woven fabric obtained was boiled in loop in warm water held at 90° to 100° C., and the amount of the residual size was reduced to less than 0.2 %. Then, the fabric was roller dried at 120° C.

The woven fabric was heat-set in a pin tenter 15 m long at various temperatures and speeds, and there was obtained a naphthalate polyester woven cloth 100 cm wide suitable for an electrical insulating material. The warp and weft densities at this time were 74 × 32.5/inch. Various heat-treating conditions and the properties of the resulting woven fabric are shown in Table 10. The stretch at this time was 1 %.

Table 10

| Heat-treatment | Run No. 32 | Run No. 33 | Run No. 34 | Run No. 35 |
|---|---|---|---|---|
| Temperature (° C.) | 200 | 260 | 230 | 265 |
| Time (seconds) | 5 | 10 | 45 | 1200 |
| **Properties** | | | | |
| Denier of the finished yarn | 50 | 50 | 50 | 50 |
| Density (yarns per inch) | | | | |
| Warp | 74 | 74 | 74 | 74 |
| Weft | 32.5 | 32.5 | 32.5 | 32.5 |
| Tensile strength (Kg/cm²) | | | | |
| Warp | 120 | 900 | 900 | 950 |
| Weft | 110 | 850 | 800 | 820 |
| Tensile elongation (%) | | | | |
| Warp | 2.0 | 23 | 25 | 10 |
| Weft | 2.0 | 27 | 30 | 12 |
| Tensile elasticity (10³ Kg/cm²) | | | | |
| Warp | 1.2 | 18 | 17 | 18 |
| Weft | 1.1 | 14 | 13 | 15 |
| Elemendorf tear strength (Kg) | | | | |
| Warp | 0.2 | 1.1 | 1.2 | 1.0 |
| Weft | 0.3 | 1.5 | 1.6 | 1.2 |
| Mullen bursting strength (Kg/cm²) | 1.0 | 8 | 8 | 8 |
| Schopper bending strength (number of times) | | | | |
| Warp | 50 | 8000 | 8500 | 8000 |
| Weft | 35 | 3000 | 4000 | 3000 |
| Shrinkage (%) in dry heat at 250° C. for 60 minutes | 8 | 1.5 | 2.0 | 2.0 |
| Flatness (seen by the naked eye) (%) | poor | good | good | poor |
| Tensile elongation after heating at 210° C. for 90 days | | | | |
| Warp | 1.0 | 10 | 13 | 6 |
| Weft | 1.5 | 11 | 14 | 8 |

Note: Runs Nos. 32 and 35 are comparisons in which the heat-treating temperatures are outside the scope defined in equations (1) and (2).

As shown in Table 10, the fabric obtained in Run No. 32 in which the heat-treatment time was shorter than that defined in equation (1), the fabric obtained had low tenacity, large shrinkage, poor flatness and an R value of 0.02, and proved unsuitable for an electrical insulating material. In contrast, in Runs Nos. 33 and 34 which satisfy the equations (1) and (2), the fabric obtained had good heat resistance, tenacity retention, low shrinkage, and good flatness with an R value of 0.50, and proved suprior as an electrically insulating material.

In Run. No. 35 in which the heat-treating time was longer than that specified in equation (2), the properties of the fabric obtained were not inferior, but it had poor processability. Furthermore, such a long period of heat-treatment is not economically feasible.

EXAMPLE 8

Polyethylene-2,6-naphthalate having an intrinsic viscosity of 0.70 was melt-spun in accordance with Example 1 while maintaining the temperature of the heating feed roller at 145° C. The resulting drawn yarn was woven and scoured, and heat-treated at 240° C. for 40 seconds to form a naphthalate polyester woven fabric having warp and weft densities of 85 × 43/inch. The fabric was subjected to a heat-deterioration test in air at high temperatures, and the results are shown in Table 11.

It was confirmed that the resulting fabric could be used as a heat-resistance material of grade F (155° C.).

Table II

| Properties after aging for 30 days at 230° C. (gear aging tester) | | |
|---|---|---|
| Properties | Initial value | After 230° C × 30 days |
| Denier of the finished yarn | 100 | 100 |
| Density (yarns/inch) | | |
| Warp | 85 | 85 |
| Weft | 43 | 43 |
| Tensile strength ($Kg/cm^2$) | | |
| Warp | 1200 | 950 |
| Weft | 900 | 800 |
| Tensile elongation (%) | | |
| Warp | 24 | 15 |
| Weft | 32 | 18 |
| Tensile elasticity ($\times 10^3$ $Kg/cm^2$) | | |
| Warp | 16 | 16 |
| Weft | 14 | 14 |
| Elemendorf tear strength (Kg) | | |
| Warp | 1.6 | 1.5 |
| Weft | 1.5 | 1.5 |
| Mullen bursting strength ($Kg/cm^2$) | 8< | 6 |
| Schopper type bending strength (number of times) | | |
| Warp | 12,000 | 9,000 |
| Weft | 11,000 | 5,000 |
| Dimensional stability (%) | | |
| Warp | 100 | 97 |
| Weft | 100 | 96 |

EXAMPLE 9

A varnish made from a copolymer of alkyd resin and methyl-phenyl siloxane (KR 206, product of Shin-etsu Chemical Co., Ltd.) was impregnated into a substrate cloth consisting of the naphthalate polyester woven fabric obtained in Example 8, followed by drying at 120° C. for 7 minutes. Then, it was baked at 200° C. for 26 minutes. The amount of the varnish impregnated was 2.7 times that of the substrate cloth.

For comparison, the above procedure was repeated except that a woven fabric made of polyethylene terephthalate yarns (100 denier/24 filaments) was used instead of the naphthalate polyester fabric. The results were compared with those obtained above, as shown in Table 12. It will be seen from the Table that the comparative example did not give good results.

Table 12

| | Present Invention | | Comparison | |
|---|---|---|---|---|
| Properties | Initial value | After 210° C × 7 days | Initial value | After 210° C × 7 days |
| Tensile strength ($Kg/cm^2$) (15 mm width) | 900 | 600 | 700 | 200 |
| Tensile elongation (%) (15 mm width) | 25 | 16 | 35 | 4 |
| Schopper bending strength (number of times) | $10^3$< | 800 | $10^4$< | Completely deteriorated. |
| Mullen bursting strength ($Kg/cm^2$) | 8< | 6 | 8< | 13 |
| Volume resistivity (ohms-cm) | $3.4 \times 10^{15}$ | $3.1 \times 10^{15}$ | $3.4 \times 10^{15}$ | $4.1 \times 10^{15}$ |
| Dielectric breakdown strength (Kv/mm) | 60 | 54 | 60 | 0 |

EXAMPLE 10

An alkyd-modified epoxy varnish (commercially available under the tradename Toshiba Grade F Varnish) was impregnated in a substrate cloth consisting of the naphthalate polyester woven fabric obtained in Example 8. The amount of the varnish was 2.7 times that of the substrate cloth. It was dried at 150° C. for 5 minutes.

The varnish-impregnated cloth obtained had the following properties.

| | Initial value | After 210° C. × 7 days |
|---|---|---|
| Tensile strength ($Kg/cm^2$) | 850 | 595 |
| Tensile elongation (%) | 17 | 15 |
| Schopper bending strength (number of times) | ca. 800 | ca. 720 |
| Mullen bursting strength ($Kg/cm^2$) | 9< | 7 |
| Volume resistivity (ohms-cm) | $5.0 \times 10^{15}$ | $4.0 \times 10^{15}$ |
| Dielectric breakdown strength (KV/mm) | 60 | 55 |

What we claim is:

1. An electric insulating material consisting of a fibrous cloth, said fibrous cloth being obtained by heat-treating a fibrous cloth consisting mainly of naphthalate polyester fiber consisting of a naphthalate polyester containing at least 85 mol % of ethylene-2,6-naphthalate units and having an intrinsic viscosity of 0.3 to 1.0, said fiber having a diffraction intensity ratio (R) between a Bragg reflection angle $2\Theta = 18.7°$ and $2\Theta = 15.6°$, as determined by the X-ray diffraction method in the range of 0.15 to 1.73, such that the heat-treating time and temperature satisfy the following equations (1) and (2)

$$T-200 <= 70\, e^{-2\log_{10} t} \quad (1)$$

$$T-200 >= 70[1-e^{-2(4-\log_{10} t)}] \quad (2)$$

wherein T is the heat-treating temperature in degrees Centigrade, *t* is the heat-treating time in seconds, and *e* is the base of a natural logarithm,

2. The electric insulating material of claim 1, wherein said fibrous cloth is impregnated with a varnish.

3. The electric insulating material of claim 2, wherein said varnish is at least one member selected from alkyd-modified silicone varnishes and alkyd-modified epoxy varnishes.

4. The electrically insulating material of claim 1 wherein said heat-treating temperature is within a range of from 210° C to the melting point of the fibrous cloth.

5. A naphthalate polyester filament, fiber or yarn, said naphthalate polyester containing at least 85 mol % of ethylene 2, 6-naphthalate units having a diffraction intensity ratio (R) between a Bragg reflection angle $2\Theta = 18.7°$ and $2\Theta = 15.6°$ as determined by the X-ray diffraction method, being in the range of 0.15 to 1.73, a tenacity of at least 4.4 *g/de*, an elongation of 13 to 40% and a toughness of at least 21.5 and a tenacity of retention of at least 50% after being treated in wet heat at 150° C for 6 hours.

6. A fibrous cloth consisting primarily of the naphthalate polyester filament, fiber or yarn of claim 5.

* * * * *

UNITED STATES PATENT AND TRADEMARK OFFICE

CERTIFICATE OF CORRECTION

PATENT NO. : 4,001,479

DATED : January 4, 1977

INVENTOR(S) : HAMANA, ET AL.

It is certified that error appears in the above-identified patent and that said Letters Patent are hereby corrected as shown below:

Claim 1, lines 39 and 40, delete equations (1) and (2) in their entirety and insert the following therefor:

-- $T\text{-}200 \geq 70\, e^{-2\log_{10}t}$ (1)

$T\text{-}200 \leq 70[1-e^{-2(4-\log_{10}t)}]$ (2) --

Signed and Sealed this

Nineteenth Day of April 1977

[SEAL]

*Attest:*

RUTH C. MASON
*Attesting Officer*

C. MARSHALL DANN
*Commissioner of Patents and Trademarks*